Patented Mar. 13, 1951

2,544,649

UNITED STATES PATENT OFFICE 2,544,649

CAUSTIC ALKALI COMPOSITION OF MATTER AND ITS USE AS A POLYVALENT METAL PRECIPITATION INHIBITOR

Frederick C. Bersworth, Verona, N. J.

No Drawing. Application January 14, 1949,
Serial No. 71,049

6 Claims. (Cl. 23—184)

This invention relates to chemistry and more particularly to chemical compositions of matter and has for its object the provision of an alkaline chemical composition of matter which consists principally of an alkali metal hydroxide, such as sodium or potassium hydroxide, and in minor part of an organic compound or mixture of compounds which is reactive with iron and similar poly-valent metal ions in alkaline pH aqueous solutions to form therewith complexes or compounds which are soluble and chemically stable in alkaline pH aqueous solutions.

Another object is to provide a method and means for treating commercial and impure grades of caustic alkalis, such as sodium and potassium hydroxides, to solubilize the iron and other poly-valent metal ions present therein in alkaline pH aqueous solutions.

A further object is to provide a caustic alkali which is soluble in commercial waters without the concurrent precipitation of the iron, and other poly-valent metals and water-hardening constituent content of said waters.

Other objects will be apparent as the invention is more fully hereinafter disclosed.

In accordance with these objects I have discovered that iron and other poly-valent metals form compounds or complexes with triethanolamine in aqueous solutions, which compounds or complexes have the unexpected property of increasing in stability and solubility with increase in the pH of the solution above a pH of about 7 and to be most stable and soluble in the highest pH solutions.

I have further discovered that the presence of relatively small amounts of a water soluble salt of a poly amino polycarboxylic acid, such as the alkali metal salt of ethylene diamine tetra-acetic acid, in the alkaline pH solution augments and increases the stability of the triethanolamine compound or complex of iron and other poly-valent metals and also stabilizes the alkaline pH solution against the precipitation of water-hardening constituents as insoluble compounds.

The exact chemical reaction involved in the present invention is at present uncertain but it seems likely, on the basis of tests and experiments to date, that in strongly alkaline pH solutions those poly-valent metal ions, such as iron, which normally are converted into insoluble hydrated iron oxides, tend to react as an acid with the basic triethanolamine or triethanolamine alcoholate salts formed in strongly alkaline solutions to form metal salts therewith of the general type $N(CH_2 \cdot CH_2 \cdot O)_3 \cdot Fe_2$ with liberation of water. This reaction increases in certainty as the pH of the solution increases above a pH of about 8 and at the highest pH about one molecular weight of the triethanolamine per two (2) Fe ions appears required to complete the reaction. However, as the pH of the solution decreases or the concentration of the solution decreases a large number of water soluble complexes appear to form in which the molar ratios of triethanolamine to Fe ions widely varies. This is believed due to the fact that upon increased ionization of the above Fe salt in water the Fe ions tend to hydrolyze and hydrated salts are formed. In extreme dilutions an excess amount of triethanolamine seems required to hold the Fe ions in solution indicating the formation of poly-molecular complexes. However, the presence of relatively small amounts of a water soluble salt of a polycarboxylic poly aminoacid, such as ethylene diamine tetra-acetic acid, appears to eliminate the necessity of using such excess triethanolamine to hold the Fe in solution in such dilute solutions. Such small amounts of the polycarboxylic poly amino acid functions also to hold in solution water-hardening constituents present in the water as water-soluble complexes thereof.

In the main, as long as the pH of the solution remains alkaline, or above about 8, the iron salt or the complexes of the iron salt with triethanolamine and the polycarboxylic poly amino acid remain soluble. As the pH approximates 7, some of the Fe is likely to be precipitated except where the amount of triethanolamine is in large excess of the amounts satisfying the above formula or in the presence of a relatively small amount of a polycarboxylic poly amino acid salt or where both of these compounds are present.

The presence of water-hardening constituents in the water of solution instead of being detrimental to solubility appears to markedly increase the solubility of and the stability of the iron salts of triethanolamine, especially in the presence of polycarboxylic poly amino acid salts indicating the formation of poly-molecular complexes having high solubilities in alkaline pH solutions wherein the iron and other metal ions are held in interior and non-reactive position in the complex. Such complex poly-molecular structures can only be shown theoretically as they may exist in aqueous alkaline pH solution.

In the commercial adaptation of these discoveries, I have found that by adding triethanolamine or the alcoholate salt of triethanolamine to commercial caustic alkali solutions prior to the removal of the water of solution therefrom in the usual process of producing concentrated and solid phase caustic alkali of commercial grades, then removing the water of solution and mixing an alkali metal salt of a polycarboxylic poly amino acid with the dehydrated caustic alkali-triethanolamine mixture, a composition of matter consisting principally of caustic alkali and in minor part of triethanolamine and of the polycarboxylic poly amino acid salt is formed which on subsequent solution in water containing iron and water-hardening constituents forms clear alkaline pH solutions which remain clear irrespective of the temperature and concentration and are the equal in all chemical respects to chemically pure caustic alkali solutions for most chemical purposes.

The amount of triethanolamine or alcoholate salt to be added to the caustic alkali solution may be varied widely without essential departure from the invention, as one skilled in the art will recognize. In general, I prefer to add an amount which is in substantial excess of that amount required to combine with the usual iron and other poly-valent metals in solution in the caustic alkali solution, the said substantial excess being that theoretically required to react with the average iron and poly-valent metal content of commercial water. For most purposes I have found that 5% triethanolamine, based on the caustic alkali content of the caustic alkali solution is an adequate amount to attain the object of the present invention, although an amount as low as .50% and as high as 10% may be used without departure from the invention.

Where the amount of triethanolamine present in the concentrated and solid phase caustic alkali is insufficient to solubilize all of the iron and other poly-valent metals in the water in which it is dissolved, the addition of triethanolamine to the alkaline pH solution followed by heating the solution to near boiling is effective in completing the solubilizing reaction.

The amount of ethylene diamine tetra-acetic acid, or its alkali metal salt, to be added to the caustic alkali-triethanolamine mixture also may be varied widely without essential departure from the invention but, in general, I have found that from 1% to 5%, based on the weight of the caustic alkali is usually adequate for commercial water of low to moderate hardness.

As one specific embodiment of the invention, but not as a limitation thereof, the production of a caustic alkali mixture containing triethanolamine in the form of its alcoholate salt and the tetra sodium salt of ethylene diamine tetra-acetic acid each in amounts found most utilizable with commercial water containing an average Fe content and a moderate amount of water-hardening constituents will be described. By average Fe content is meant an iron content of about 5 parts per million. By a moderate amount of water-hardening constituents is meant a water-hardness of about 100 parts per million calculated as CaCO₃.

In accordance with this embodiment I add to the caustic alkali (NaOH) solution, produced for example by the well known process of producing same commercially involving the electrolysis of a sodium chloride solution, an amount of triethanolamine approximating 5% of the weight of the NaOH in any given volume of the solution, the addition being made at the stage in the evaporation or dehydration process when the solution is ready for its final evaporation to concentrated or solid phase condition. By "concentrated" is meant approximately 50% NaOH solution and by "solid phase" is meant approximately 70%–75% NaOH solution, which at atmospheric temperatures is a solid.

At this stage in the manufacturing operation the iron content of the caustic alkali solution is low but somewhat variable in amount but is as low and as uniform as can be obtained under usual manufacturing conditions. The triethanolamine generally reacts quickly and completely with the iron content of the concentrated caustic alkali solution and the water content of the solution thereafter may be removed by any of the evaporation methods now commercially employed to the extent desired. Evaporating temperatures in excess of about 250° C., and a combination of temperature and pressure effective to vaporize the excess triethanolamine, should be avoided so as to retain the excess triethanolamine in the concentrated or solid phase NaOH.

Alternatively, where solid phase caustic soda is desired (70%–75% NaOH) only a sufficient amount of the triethanolamine to react completely with the iron content of the caustic alkali may be added to the 50% NaOH solution and the balance of the 5% triethanolamine may be added to the caustic alkali after the concentration has been increased to 70%–75% NaOH where the dehydration temperatures and pressures are unfavorable to the retention of the excess triethanolamine in the heated caustic alkali.

To the thus formed dry mixture of NaOH and triethanolamine I then add 2% to 3% of the tetra-sodium salt of ethylene diamine tetra-acetic acid, preferably as a 20% solution which is sprayed onto the broken or granulated solid phase mixture and the mixture then is subjected to a final drying operation to remove the water of solution thus added.

Alternatively, where spray drying of the triethanolamine-caustic alkali solution to a solid phase product is practiced, the 20% solution of the tetra salt of the amino acid may be introduced separately into the spray drier for simultaneous dehydration in admixture with the caustic alkali solution.

The resulting solid phase mixture of NaOH, triethanolamine alcoholate and tetra salt of the amino acid, then may be processed and packaged for shipment as heretofore practiced. This mixture, which contains approximately 5 lbs. triethanolamine as the alcoholate salt and 2–3 lbs. of the tetra sodium salt of ethylene diamine tetra-acetic acid per 100 lbs. of NaOH, may be dissolved in commercial waters having an iron content of 5 parts per million and of low to medium hardness without the formation of insoluble precipitates of iron or of insoluble water-hardening constituents as long as the normality of the solution is not under .01 normal. The resulting alkaline pH solution will remain clear at all temperatures up to boiling and over an extended time interval as long as the pH of the solution remains above a pH of about 8.

For purposes of the present invention other polycarboxylic poly amino acids and their alkali metal salts may be substituted for the alkali metal salt of ethylene diamine tetra-acetic acid without departure from the invention, such salts heretofore being known and recognized as substantial equivalents for the tetra salt of the specific embodiment as water-softening agents in hard waters.

In place of triethanolamine a number of other poly hydroxy amines and poly amines form alcoholate salts and form similar compounds and complexes with iron and other poly-valent metals similar properties to those hereinabove described with triethanolamine and for the purposes of the present invention are substantial equivalents for the triethanolamine.

It is believed apparent that the invention may be widely varied without essential departure therefrom and all such modifications and adaptations thereof are contemplated as may fall within the scope of the following claims.

What I claim is:

1. In the method of inhibiting the precipitation of Fe and other poly-valent metals in alkaline pH aqueous solutions which comprises incorporating therein an amount of triethanolamine alcoholate salt which is at least approximately sufficient to react substantially completely with the said iron to form a soluble iron salt therewith, said amount being in the approximate ratio of one molar weight of the triethanolamone to each two (2) iron molecules present in the solution.

2. The method of inhibiting the precipitation of iron and other poly-valent metals and of water-hardening constituents in alkaline pH so-solutions which comprises incorporating in the solution an amount of triethanolamine alcoholate approximating one molar weight per two molar weights of such iron and other poly-valent metals present in the solution and a small amount of the tetra alkali metal salt of ethylene diamine tetra-acetic acid, said amount being approximately that sufficient to solubilize the water-hardening constituents as soluble tetra-acetic acid complexes.

3. A composition of matter consisting of a caustic alkali, triethanolamine alcoholate salt and the tetra alkali metal salt of ethylene diamine tetra-acetic acid, the triethanolamine amounting to from .50% to 10% and the said tetra salt amounting to 1% to 5% of the weight of the caustic alkali.

4. A composition of matter consisting of NaOH, triethanolamine and the tetra sodium salt of ethylene diamine tetra-acetic acid, the amount of the triethanolamine and the tetra sodium salt in said mixture being from 2% to 10% and 1% to 5%, respectively, based on the weight of the NaOH.

5. The composition of claim 4, wherein the amount of the triethanolamine approximates 5% and the amount of said tetra sodium salt approximates 2% to 3%, based on the weight of the said NaOH.

6. A composition of matter consisting of a caustic alkali and triethanolamine alcoholate, the amount of said alcoholate being from .50 to 10%.

FREDERICK C. BERSWORTH.

REFERENCES CITED

The following references are of record in the file of this patent:

UNITED STATES PATENTS

| Number | Name | Date |
| --- | --- | --- |
| 2,196,596 | Muskat | Apr. 9, 1940 |